US007158819B1

(12) United States Patent
Pulimi et al.

(10) Patent No.: US 7,158,819 B1
(45) Date of Patent: Jan. 2, 2007

(54) ANTENNA APPARATUS WITH INNER ANTENNA AND GROUNDED OUTER HELIX ANTENNA

(75) Inventors: Narendra Pulimi, Schaumburg, IL (US); Li Chen, Buffalo Grove, IL (US); Vimal Natarajan, Waukegan, IL (US)

(73) Assignee: Motorola, Inc., Schaumburg, IL (US)

( * ) Notice: Subject to any disclaimer, the term of this patent is extended or adjusted under 35 U.S.C. 154(b) by 904 days.

(21) Appl. No.: 09/606,445

(22) Filed: Jun. 29, 2000

(51) Int. Cl.
*H04Q 7/20* (2006.01)

(52) U.S. Cl. .................... 455/575.5; 455/274; 343/702

(58) Field of Classification Search ................ 455/550, 455/90, 575.5, 83, 97, 107, 121, 193.1, 269, 455/274; 343/702, 895, 792, 901, 725
See application file for complete search history.

(56) References Cited

U.S. PATENT DOCUMENTS

| | | | | | |
|---|---|---|---|---|---|
| 4,442,438 | A | | 4/1984 | Siwiak et al. | 343/792 |
| 4,725,845 | A | * | 2/1988 | Phillips et al. | 343/895 |
| 4,772,895 | A | * | 9/1988 | Garay et al. | 343/895 |
| 5,231,412 | A | * | 7/1993 | Eberhardt et al. | 343/790 |
| 5,563,615 | A | * | 10/1996 | Tay et al. | 343/749 |
| 5,771,023 | A | * | 6/1998 | Engblom | 343/702 |
| 5,799,246 | A | * | 8/1998 | Luzzatto et al. | 455/76 |
| 5,812,097 | A | * | 9/1998 | Maldonado | 343/790 |
| 5,835,065 | A | * | 11/1998 | Wallace et al. | 343/702 |
| 5,841,407 | A | * | 11/1998 | Birnbaum | 343/895 |
| 5,854,970 | A | * | 12/1998 | Kivela | 455/90 |
| 5,945,964 | A | * | 8/1999 | De Groot et al. | 343/895 |
| 5,963,871 | A | * | 10/1999 | Zhinong et al. | 455/550 |
| 6,052,090 | A | * | 4/2000 | Simmons et al. | 343/702 |
| 6,054,966 | A | * | 4/2000 | Haapala | 343/895 |
| 6,057,807 | A | * | 5/2000 | Marthinsson et al. | 343/895 |
| 6,075,488 | A | * | 6/2000 | Hope | 343/702 |
| 6,127,979 | A | * | 10/2000 | Zhou et al. | 343/702 |
| 6,163,300 | A | * | 12/2000 | Ishikawa et al. | 343/702 |
| 6,275,198 | B1 | * | 8/2001 | Kenoun et al. | 343/895 |

* cited by examiner

*Primary Examiner*—Jean Gelin
(74) *Attorney, Agent, or Firm*—Paul J. Bartusiak; Randall S. Vaas; Lawrence J. Chapa

(57) ABSTRACT

A dual-band cellular telephone antenna. A monopole antenna is tuned to a first resonant frequency of operation. A first helical antenna is coupled to the monopole antenna and has turns surrounding the monopole antenna, where the first helical antenna is tuned to a second resonant frequency of operation. A grounded second helical antenna surrounds the first helical antenna and is formed to have an upper capacitive loading segment to tune the grounded second helical antenna at substantially the second resonant frequency of operation. The cellular telephone has a housing formed of a conductive material. A printed circuit board (PCB) has a metalized ground plane, wherein the metalized ground plane and the grounded second helical antenna are coupled to the cellular telephone housing.

15 Claims, 2 Drawing Sheets

ANTENNA APPARATUS WITH INNER ANTENNA AND GROUNDED OUTER HELIX ANTENNA

FIELD OF THE INVENTION

This invention generally relates to antennas. More specifically, this invention relates to a multi-band, three conductor antenna.

BACKGROUND OF THE INVENTION

There is a continuing need to improve the performance of cellular telephone antennas. For example, the efficiency of the cellular telephone antenna can significantly impact the amount of energy needed to send and receive signals.

If an antenna is inefficient, the power amplifier of a cellular telephone has to produce a higher power signal to overcome the inefficiency of the antenna. Moreover, on the receive side of operation, the sensitivity of the cellular telephone is impacted by the efficiency of the antenna.

Furthermore, cellular telephones are increasingly designed to operate via more than one frequency band. A first frequency band of operation might be around 800 MHz, and a second band of operation might be around 2 GHz. Therefore, there is a need for more efficient antenna structures that are adaptable to multi-band operation. There is a further need for an efficient antenna structure with a bandwidth large enough to cover cellular frequency bands of operation.

DETAILED DESCRIPTION OF PREFERRED EMBODIMENTS

Figure 1:
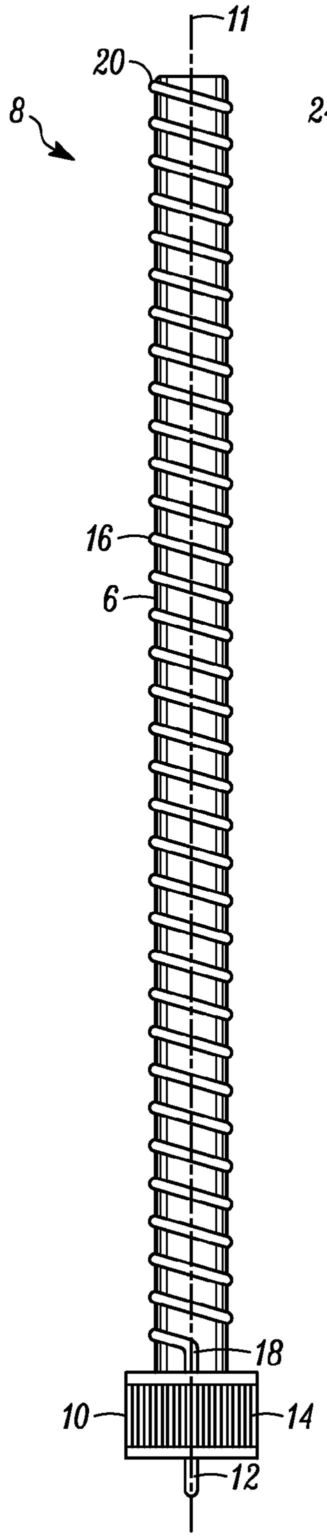
FIG. 1 is a representation of an inner helical antenna structure.

FIG. 1 is a representation of an inner helical antenna structure 8. The inner helical antenna structure 8 includes a coaxial connector 10 having a center conductor 12 and a ground 14. The inner helical antenna structure 8 further includes a resonator, here shown as inner helical antenna 16 having ends 18 and 20. End 18 is coupled to the center conductor 12 of coaxial connector 10. The inner helical antenna 16 is formed to have helical turns wrapped around a dielectric form material 6 along linear axis 11, and the distance between adjacent turns are substantially equal along the entire length of the inner helical antenna 16.

The electrical length of the inner helical antenna 16 is selected to be near λ/4, where λ is the wavelength corresponding to the desired (resonant) center frequency of the inner helical antenna 16. Several design parameters affect the actual physical length selected for the inner helical antenna 16. For example, the diameter of the helical turns will alter the necessary physical length as is known to those skilled in the art. In the illustrated embodiment, the center frequency is designed to be near 800 MHz for the cellular frequency band.

As already mentioned, the antenna structure shown in FIG. 1, as well as the other embodiments of the invention, are for use with a cellular telephone or other portable, wireless system. A conventional cellular telephone includes a transmitter for transmitting signals, a receiver for receiving signals, a synthesizer coupled to the transmitter and receiver for generating carrier frequency signals, and a controller for controlling operation of the cellular telephone.

Figure 2:
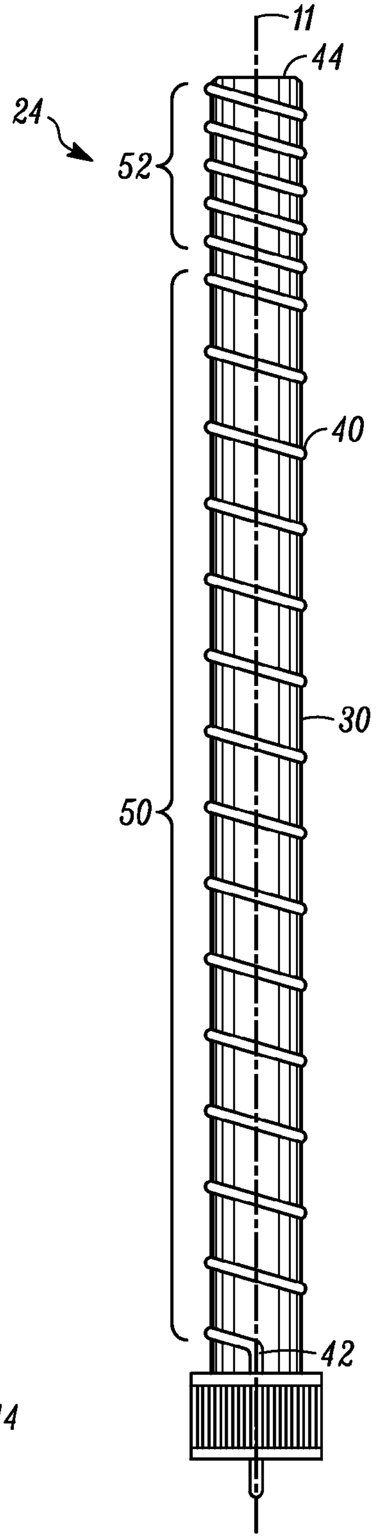
FIG. 2 is a representation of a grounded outer helical antenna structure surrounding the inner helical antenna structure of FIG. 1 in accordance with a first embodiment of the present invention.

FIG. 2 is a representation of a grounded outer helical antenna structure 24 surrounding the inner helical antenna 16 of FIG. 1 in accordance with a first embodiment of the present invention. In all of the drawing figures, like numbers represent like components. A cylindrical dielectric spacer 30 is situated substantially over the entire portion of the inner helical antenna 16. The spacer 30 insulates the inner helical antenna 16 (FIG. 1) from a second resonant element referred to here as a radio frequency (RF) grounded helical antenna 40 (FIG. 2). The grounded helical antenna 40 is coupled to the ground portion 14 of connector 10 (FIG. 1) at end 42. The grounded helical antenna is wound around the inner helical antenna 16 and the spacer 30 so as to surround the inner helical antenna 16.

The grounded helical antenna 40 is formed to have a first section 50 of adjacent helical turns that are spaced farther apart than adjacent helical turns of the inner helical antenna 16. Furthermore, the grounded helical antenna 40 is formed to have an upper capacitive loading section 52 to tune the grounded helical antenna 40 to substantially the resonant frequency of operation of the inner helical antenna 16. The capacitive loading section 52 is located at an end 44 opposite end 42.

Thus, the first section 50 has a distance between adjacent turns of a first predetermined amount, and the second section has a distance between adjacent turns of a second predetermined amount, where the second predetermined amount is less than the first predetermined amount. This antenna configuration yields improved antenna efficiency, during normal cellular telephone use, with sufficient bandwidth to operate over cellular frequency bands. A variable pitch is utilized in the grounded helical antenna 40 to maximize the bandwidth performance while still maintaining the proper resonant frequency of the grounded helical antenna 40. The resonant frequency of operation of the grounded helical antenna 40 is substantially equal to the frequency of operation of the inner helical antenna 16.

The thickness of spacer 30 (FIG. 2) is selected to be sufficiently small such that grounded helical antenna 40 it tightly electrically coupled to inner helical antenna 16. Once again several design parameters exist to tune the performance of the overall antenna structure. For example, decreasing the distance between helical turns in the capacitive loading section 52 increases the bandwidth of the grounded helical antenna but also increases the resonant frequency. Therefore, the first section is tuned to compensate for the increased center frequency. As mentioned previously, the electrical length of the inner helical antenna 16 is selected to be near λ/4, where λ is the wavelength corresponding to the center (resonant) frequency of the inner helical antenna 16. The optimal electrical length of the grounded helical antenna was experimentally determined to be substantially 3λ/8. It will be obvious to those skilled in the art that other electrical lengths for the inner helical antenna 16 and the grounded helical antenna 40 may be chosen for a same center frequency depending upon other design parameters (e.g. diameter of the helical turns of the grounded helical antenna 40, the spacing between helical turns, the thickness of the spacer 30, etc.).

Figure 3:
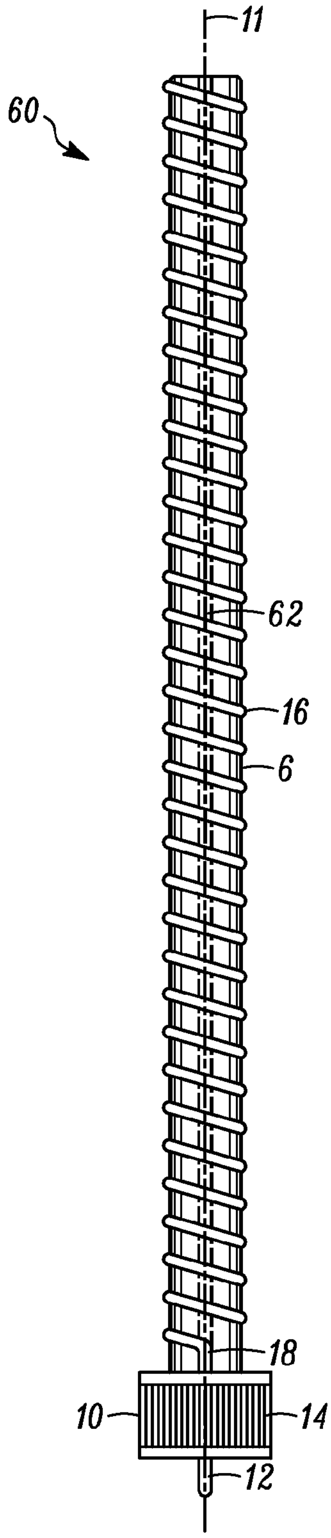
FIG. 3 is a representation of a combination monopole and inner helical antenna structure for use with the grounded, outer helical antenna structure shown in FIG. 2 in accordance with a second embodiment of the present invention.

FIG. 3 shows a multi-band antenna structure 60 for use with the grounded, outer helical antenna 40 (FIG. 2) in accordance with a second embodiment of the present invention. To achieve multi-band operation, a conductive wire, here referred to as monopole antenna 62, runs through the center of the inner helical antenna 16 and the dielectric 6 for the entire length of the inner helical antenna 16. The electrical length of the monopole antenna 62 is $\lambda/4$, where $\lambda$ is the wavelength corresponding to the center (resonant) frequency of the personal communications system (PCS) cellular frequency band, which is approximately 1.8 GHz. The multi-band antenna structure of FIG. 3 is then combined with the grounded helical antenna 40 (FIG. 2) to obtain a multi-band antenna with improved efficiency, during normal cellular telephone use, over a given bandwidth as compared to the prior art cellular telephone antenna technology.

Figure 4:
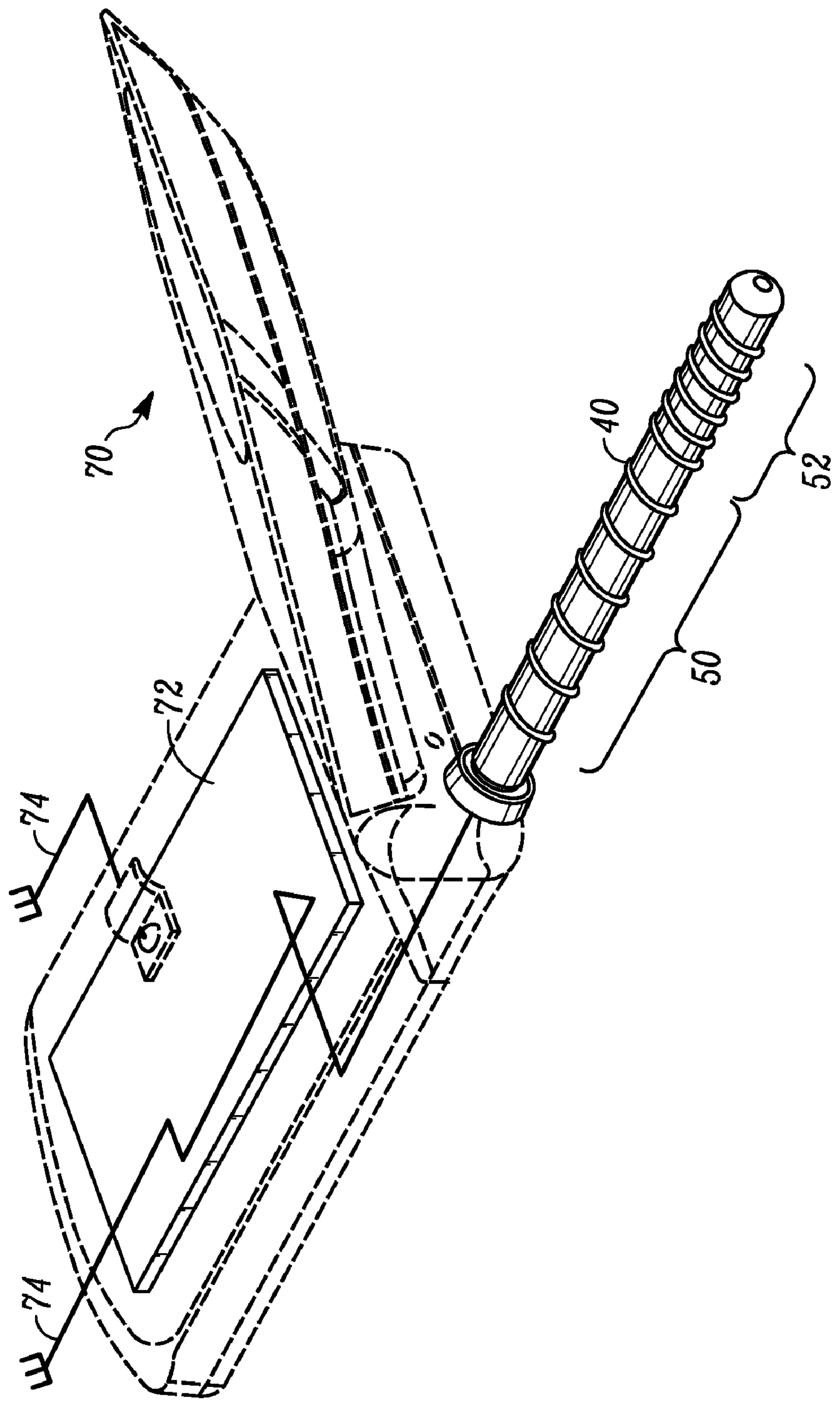
FIG. 4 shows the grounded helical antenna structure of FIG. 2 combined with a conductive cellular telephone housing in accordance with a third embodiment of the present invention.

FIG. 4 shows the grounded helical antenna 40 combined with a conductive cellular telephone housing 70 in accordance with a third embodiment of the present invention. Rather than just ordinary plastic, the cellular telephone housing 70 is formed of a conductive material as is known in the art. At least one printed circuit board (PCB) 72 is carried by the cellular telephone housing 70, and the PCB 72 has a metalized ground plane represented by ground 74 as is known in the art. The metalized ground plane and the grounded helical antenna 40 are coupled to the cellular telephone housing 70 through conventional means as is known in the art.

The coupling the grounded helical antenna 40 to ground along with the cellular telephone housing 70 is used in conjunction with the first embodiment shown in FIG. 1 or the second embodiment shown in FIG. 2 to provide additional improvement in antenna performance. It has been observed experimentally that the antenna return currents on the RF ground 74 as well as on the conductive cellular housing 70 are minimal and the return currents are diverted into the outer, grounded helical antenna 40. This improves the radiated efficiency while still meeting bandwidth requirements.

The previous description of the preferred embodiments are provided to enable any person skilled in the art to practice the preferred embodiments. Various modifications to these embodiments will be readily apparent to those skilled in the art, and the generic principles defined herein may be applied to other embodiments without the use of the inventive faculty. For example, the illustrated embodiments show an inner helix antenna surrounded by a grounded, outer helix antenna. In alternate embodiments, an inner antenna can be surrounded by the grounded outer helix antenna tuned to substantially the same resonant frequency, but the inner antenna is an antenna structure different from a conventional helix antenna. Thus, those skilled in the art of cellular telephone antenna design will recognize that other antenna structures may be used as the inner antenna, depending upon the design parameters (e.g. cost, size, antenna directivity, etc.). Still further, the cellular telephone of FIG. 4 is shown to include two movably attached housing sections. In an alternate embodiment, the cellular telephone comprises only one conductive housing section. Still further, other means of connecting the antenna structures to a coaxial cable or to a PCB may be employed without deviating from the spirit of the present invention.

We claim:

1. A multi-band antenna apparatus comprising:

a multi-band antenna including a first element, which extends along a linear axis, and a second element, which extends along the linear axis, beside the first element, the first and second elements having different resonant frequencies; and a grounded helical antenna surrounding the multi-band antenna.

2. The multi-band antenna apparatus as in claim 1 further comprising:

a cellular telephone housing formed of a conductive material; and a printed circuit board (PCB) carried by the cellular telephone housing, the PCB having a metalized ground plane, the metalized ground plane and the grounded helical antenna coupled to the cellular telephone housing.

3. A multi-band antenna apparatus comprising:

a multi-band antenna including a helical antenna and a monopole antenna, the helical antenna and the monopole antenna having different resonant frequencies; and a grounded helical antenna surrounding the multi-band antenna.

4. The multi-band antenna apparatus as in claim 3 wherein the grounded helical antenna includes turns around a linear axis, a distance between at least some adjacent turns of the grounded helical antenna varying along the linear axis.

5. The multi-band antenna apparatus as in claim 4 wherein the grounded helical antenna comprises a top section and a lower section along the linear axis, the lower section coupled to the metalized ground plane and the top section located at an end opposite the lower section along the linear axis, a distance between adjacent turns of the top section narrower than a distance between adjacent turns of the lower section.

6. A cellular telephone antenna comprising:

an inner antenna including a first element and a second element, the first and second elements having different resonant frequencies; and a radio frequency (RF) grounded helical antenna surrounding the inner antenna, the RF grounded helical antenna including, a first section having a distance between adjacent turns of a first predetermined amount, and a second section having a distance between adjacent turns of a second predetermined amount, the second predetermined amount less than the first predetermined amount.

7. The cellular telephone antenna as in claim 6 wherein a resonant frequency of the RF grounded helical antenna is substantially equal to a resonant frequency of one of the first and second elements of the inner antenna.

8. The cellular telephone antenna as in claim 6 further comprising:

a cellular telephone housing formed of a conductive material; and a printed circuit board (PCB) carried by the cellular telephone housing, the PCB having a metalized ground plane, the metalized ground plane and the RF grounded helical antenna coupled to the cellular telephone housing.

9. The cellular telephone antenna as in claim 6 wherein the first antenna element comprises an inner helical element, and wherein the resonant frequency of the RF grounded helical antenna is substantially equal to a resonant frequency of the inner antenna.

10. The cellular telephone antenna as in claim 9 further comprising:

a cellular telephone housing formed of a conductive material; and a printed circuit board (PCB) carried by the cellular telephone housing, the PCB having a metalized ground plane, the metalized ground plane and the RF grounded helical antenna electrically coupled to the cellular telephone housing.

11. A cellular telephone antenna comprising:

a monopole antenna tuned to a first resonant frequency of operation;

a first helical antenna coupled to the monopole antenna and having turns surrounding the monopole antenna, the first helical antenna tuned to a second resonant frequency of operation; and an electronically grounded second helical antenna surrounding the first helical antenna, the electronically grounded second helical antenna formed to have an upper capacitive loading segment to tune the electronically grounded second helical antenna at substantially the second resonant frequency of operation.

12. The cellular telephone antenna as in claim 11 further comprising:

a cellular telephone housing formed of a conductive material; and a printed circuit board (PCB) carried by the cellular telephone housing, the PCB having a metalized ground plane, the metalized ground plane and the electronically grounded second helical antenna coupled to the cellular telephone housing.

13. A cellular telephone comprising:

transmitter for transmitting signals;

a receiver for receiving signals;

a synthesizer coupled to the transmitter and receiver for generating carrier frequency signals;

a controller for controlling operation of the cellular telephone;

a first helical antenna coupled to the transmitter and the receiver, the first helical antenna tuned to a resonant frequency of operation; and a grounded helical antenna surrounding the first helical antenna, the grounded helical antenna formed to have a first section of adjacent helical turns that are spaced farther apart than adjacent helical turns of the first helical antenna, the grounded helical antenna formed to have an upper capacitive loading segment to tune the grounded helical antenna to substantially the resonant frequency of operation.

14. The cellular telephone as in claim 13 further comprising:

a cellular telephone housing formed of a conductive material; and a printed circuit board (PCB) having a metalized ground plane, the metalized ground plane and the grounded second helical antenna coupled to the cellular telephone housing.

15. The cellular telephone as in claim 14 further comprising a monopole antenna coupled to the first helical antenna and tuned to a second resonant frequency of operation.

* * * * *